US005790892A

United States Patent [19]
Kaiser et al.

[11] Patent Number: 5,790,892
[45] Date of Patent: Aug. 4, 1998

[54] INFORMATION HANDLING SYSTEM FOR MODIFYING COHERENCY RESPONSE SET TO ALLOW INTERVENTION OF A READ COMMAND SO THAT THE INTERVENTION IS NOT ALLOWED BY THE SYSTEM MEMORY

[75] Inventors: John Michael Kaiser; Warren Edward Maule, both of Cedar Park, Tex.

[73] Assignee: International Business Machines Corporation, Armonk, N.Y.

[21] Appl. No.: 536,885

[22] Filed: Sep. 29, 1995

[51] Int. Cl.⁶ .................................................. G06F 13/00
[52] U.S. Cl. .................. 395/868; 395/468; 395/825; 395/849; 395/860
[58] Field of Search ................. 340/825.34; 395/296, 395/403, 460, 472, 617, 821, 468, 825, 849, 860, 868

[56] References Cited

U.S. PATENT DOCUMENTS

| 3,794,979 | 2/1974 | McMahon | 395/567 |
| 4,992,783 | 2/1991 | Zdunek et al. | 340/825.34 |
| 5,241,629 | 8/1993 | Barlow et al. | 395/302 |
| 5,255,387 | 10/1993 | Arnold et al. | 395/617 |
| 5,297,269 | 3/1994 | Donaldson et al. | 395/472 |
| 5,375,211 | 12/1994 | Maruyama et al. | 395/290 |
| 5,483,645 | 1/1996 | Tran | 395/403 |
| 5,490,253 | 2/1996 | Laha et al. | 395/304 |
| 5,506,971 | 4/1996 | Gullette et al. | 395/296 |
| 5,553,248 | 9/1996 | Melo et al. | 395/296 |
| 5,555,398 | 9/1996 | Raman | 395/470 |
| 5,586,298 | 12/1996 | Shah | 395/473 |
| 5,611,070 | 3/1997 | Heidelberger et al. | 395/460 |
| 5,613,153 | 3/1997 | Arimilli et al. | 395/821 |

*Primary Examiner*—Thomas C. Lee
*Assistant Examiner*—Po C. Huang
*Attorney, Agent, or Firm*—Jenkens & Gilchrist; Raymond M. Galasso; Anthony V. S. England

[57] ABSTRACT

An information handling system includes a number of processors, each connected to a processor bus, a memory controller connected to the processor bus which controls access to a system memory, a system controller, and one or more I/O controllers connected to the system bus where the system controller controls access to the system bus by all of the elements connected to the system bus, and the memory controller provides an efficient mechanism for handling data access to memory on read commands if a coherency response is modified. Combiner-prioritization logic in the memory controller includes logic in response to two additional inputs not shown in the prior art. The first logic responds to a read command and signals when a response window currently being combined is from a read command, and the second logic signals that the memory has an intervention buffer available to allow intervention.

4 Claims, 6 Drawing Sheets

INFORMATION HANDLING SYSTEM FOR MODIFYING COHERENCY RESPONSE SET TO ALLOW INTERVENTION OF A READ COMMAND SO THAT THE INTERVENTION IS NOT ALLOWED BY THE SYSTEM MEMORY

BACKGROUND OF THE INVENTION

1. Technical Field of the Invention.

The present invention relates to information handling systems, and more particularly to information handling systems including a memory controller which supports intervention.

BACKGROUND OF THE INVENTION

Snoopy MP buses for high end computer systems support intervention as described in U.S. patent application Ser. No. 08/317,256, now U.S. Pat. No. 5,659,708, wherein is described the method and protocol for intervention of Read or RWITM data when data has been modified by another cache entity. Following this protocol on a Read, a memory controller is responsible to capture data and write it to memory if the coherency response is modified.

Since the memory controller is already processing the read command, this places a burden on it to allocate buffer space for both the read and also possibly capture the modified data and perform a memory update due to the intervention. This extra buffer is called an intervention buffer. There are several options available to deal with this problem.

1) the memory could wait until the coherency response has been determined and therefore a single buffer for either the read or writeback could be used; however, this is extremely costly in terms of the average memory latency;

2) the memory controller could implement a writeback buffer for each outstanding Read command allowed, but this is costly in terms of circuits used, since the buffers need to contain a full cache line and a high performance SMP memory controller needs to support many outstanding reads; or 3) the memory controller could implement a single intervention buffer and not process any future reads (retry them) until that buffer is freed up.

SUMMARY OF THE INVENTION

Therefore, it is an object of the present invention to improve system and memory performance in an information handling system including a memory controller which supports intervention using only a single intervention buffer.

Accordingly, an information handling system includes a number of processors, each connected to a processor bus, a memory controller connected to the processor bus which controls access to a system memory, a system controller, and one or more I/O controllers connected to the system bus where the system controller controls access to the system bus by all of the elements connected to the system bus, and the memory controller provides an efficient mechanism for handling data access to memory on read commands if a coherency response is modified. Combiner-prioritization logic in the memory controller includes logic in response to two additional inputs not shown in the prior art. The first logic responds to a read command and signals when a response window currently being combined is from a read command, and the second logic signals that the memory has an intervention buffer available to allow intervention.

It is an advantage of the present invention that system and memory performance may be enhanced in an information handling system wherein intervention required on read commands is efficiently handled using a single intervention buffer.

Other features and advantages of the present invention will become apparent in the following detailed description of the preferred embodiment of the invention taken in conjunction with the accompanying drawing.

DETAILED DESCRIPTION OF A PREFERRED EMBODIMENT OF THE INVENTION

The present invention is an improvement to the invention described in U.S. patent application Ser. No. 08/316,980, now U.S. Pat. No. 5,608,878. U.S. patent application Ser. No. 08/316,980, now U.S. Pat. No. 5,608,878 is hereby incorporated by reference.

Two inputs are added to the system controller logic described in 08/316,980, now U.S. Pat. No. 5,608,878 that is combining and prioritizing the AResp signals. These signals are from the memory controller logic and indicate (1) that the response window currently being combined is from a Read command, and (2) the memory has the resources (buffers) to allow intervention. The combiner logic according to the present invention can change a Modified input response to a Retry output response for a Read when the memory cannot allow intervention. When the memory can allow intervention, the Modified response is returned unmodified.

(The Read command input is to distinguish Reads from the RWITM commands which also receive a Modified response from being retried, since they do not need a buffer as memory does not copy that data.) This allows all Reads to proceed even though the memory intervention buffer is full, as long as those reads do not receive a Modified response.

Figure 1:
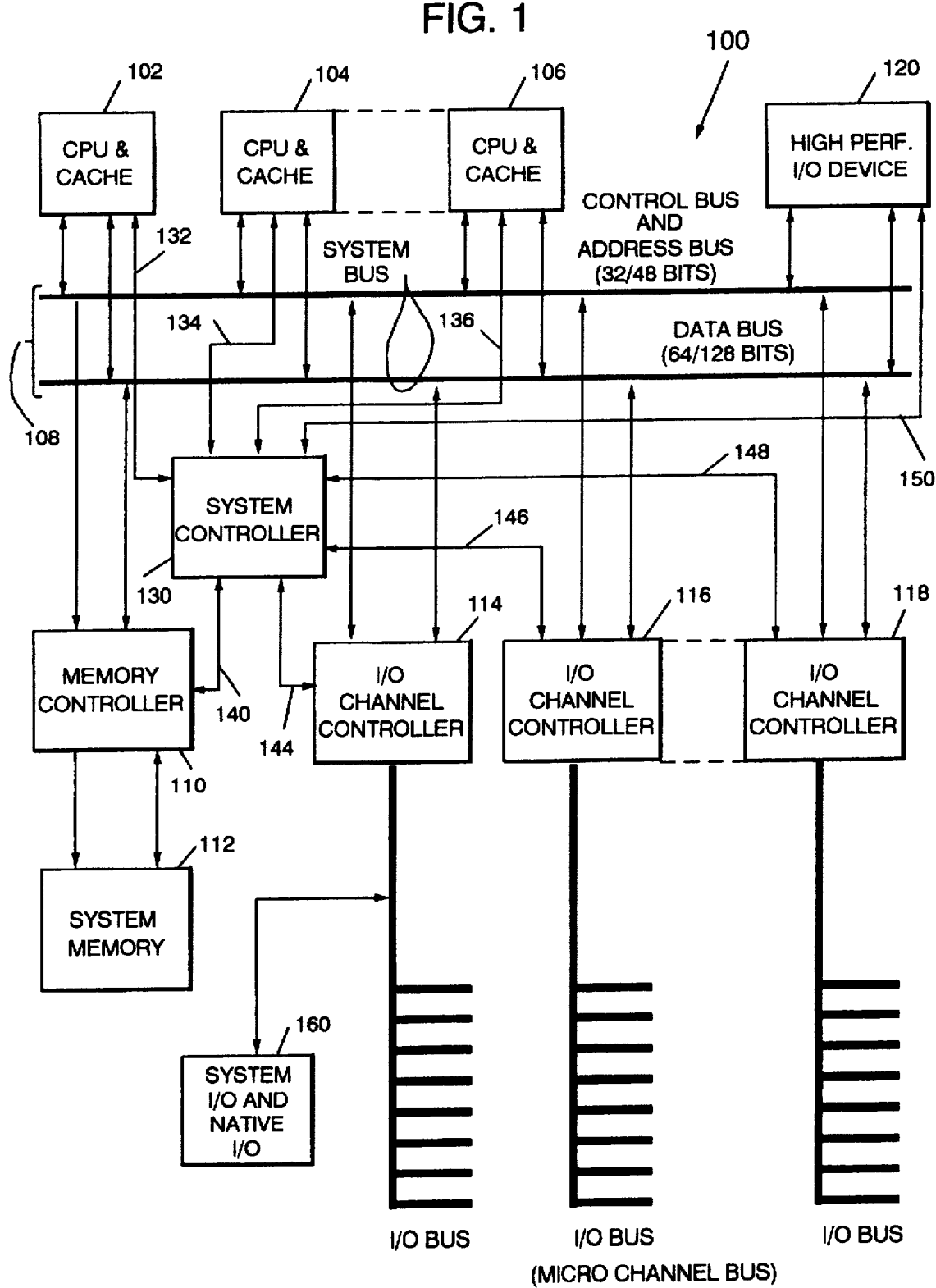
FIG. 1 is a is a block diagram of an information handling system in accordance with the present invention.

Referring now to FIG. 1, an information handling system 100 embodying the present invention will be described. Multiprocessor system 100 includes a number of processing units 102, 104, 106 operatively connected to a system bus 108. Also connected to the system bus 108 is a memory controller 110, which controls access to system memory 112, and I/O channel controllers 114, 116, and 118. Additionally, a high performance I/O device 120 may be connected to the system bus 108. Each of the system elements described 102—120, inclusive, operate under the control of system controller 130 which communicates with each unit connected to the system bus 108 by point to point lines such as 132 to processor 102, 134 to processor 104, 136 to processor 106, 140 to controller 110, 144 to I/O channel controller 114, 146 to I/O channel controller 116, 148 to I/O channel controller 118, and 150 to high performance I/O device 120. Requests and grants of bus access are all controlled by system controller 130.

I/O channel controller 114 controls and is connected to system I/O subsystem and native I/O subsystem 160.

Each processor unit 102, 104, 106 may include a processor and a cache storage device.

One of the bus devices, such as processor 102, may request to enable an operation onto bus 108 from system controller 130 via connection 132. Upon receiving a bus grant from system controller 130, processor 102 will then enable an address onto bus 108.

Figure 2:
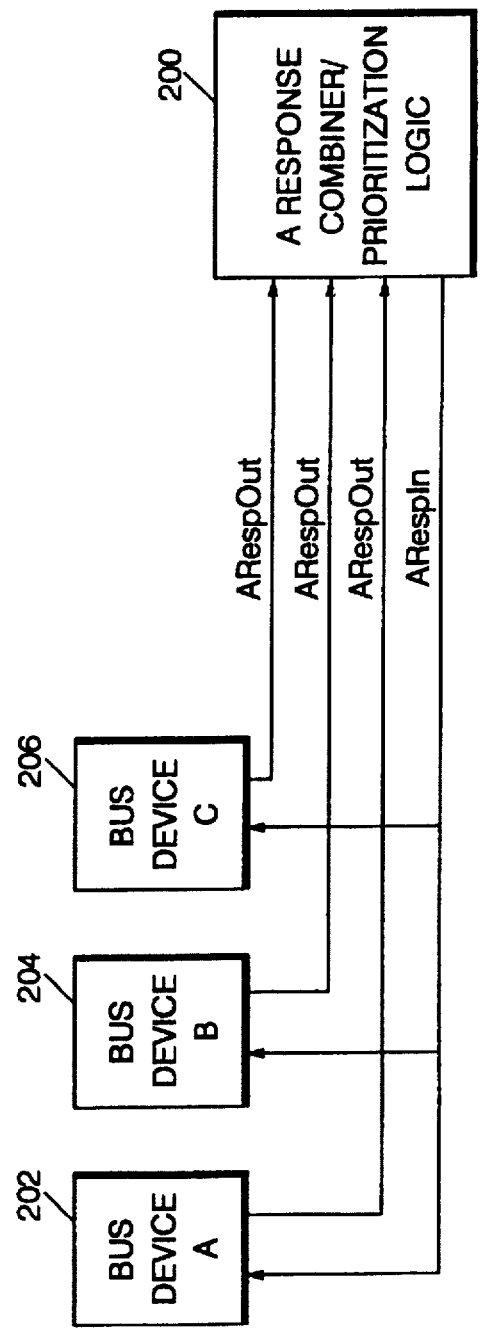
FIG. 2 is a block diagram of combining/prioritization logic in accordance with a prior art memory controller in an information handling system.

Referring now to FIG. 2, response combination/prioritization logic 200 in accordance with a prior art system will be described.

U.S. patent application Ser. No. 08/316,980, now U.S. Pat. No. 5,608,878 describes combining logic 200 which receives multiple AResp responses driven to memory controller 110 (see FIG. 1) unidirectionally from each bus participant 202, 204, 206. The signals ARespOut from bus devices 202, 204, and 206 are sent to combining logic 200 which combines all response signals and returns a combined response ARespIn to all bus devices 202, 204, and 206.

Figure 3:
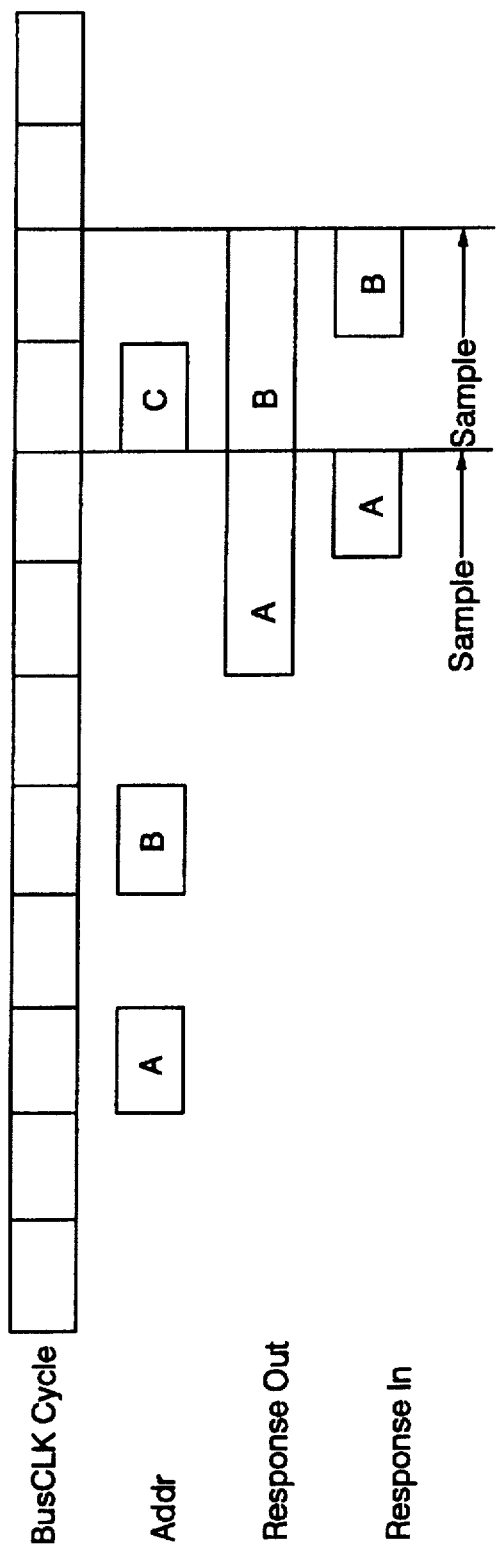
FIG. 3 is a timing chart showing the operation of the prior art logic of FIG. 2.

The timing of the signals is shown in FIG. 3. Additionally, combining logic 200 prioritizes responses, since bus devices 202, 204, and 206 may be signalling different responses. A priority is established by protocol where the priorities are set as follows:

NULL—priority 4;

SHARED—priority 3;

MODIFIED—priority 2; and

RETRY—priority 1.

Thus, the retry response has the highest priority, and the null response has the lowest priority.

The embodiment of the present invention utilizes the relative priority of modified and retried responses and, in predetermined instances, changes a modified response to a retry response.

FIG. 3 shows the addresses sent to the memory controller 110 by bus devices 202, 204, and 206 during different bus clock cycles and the timing of response in and response out signals.

Figure 4:
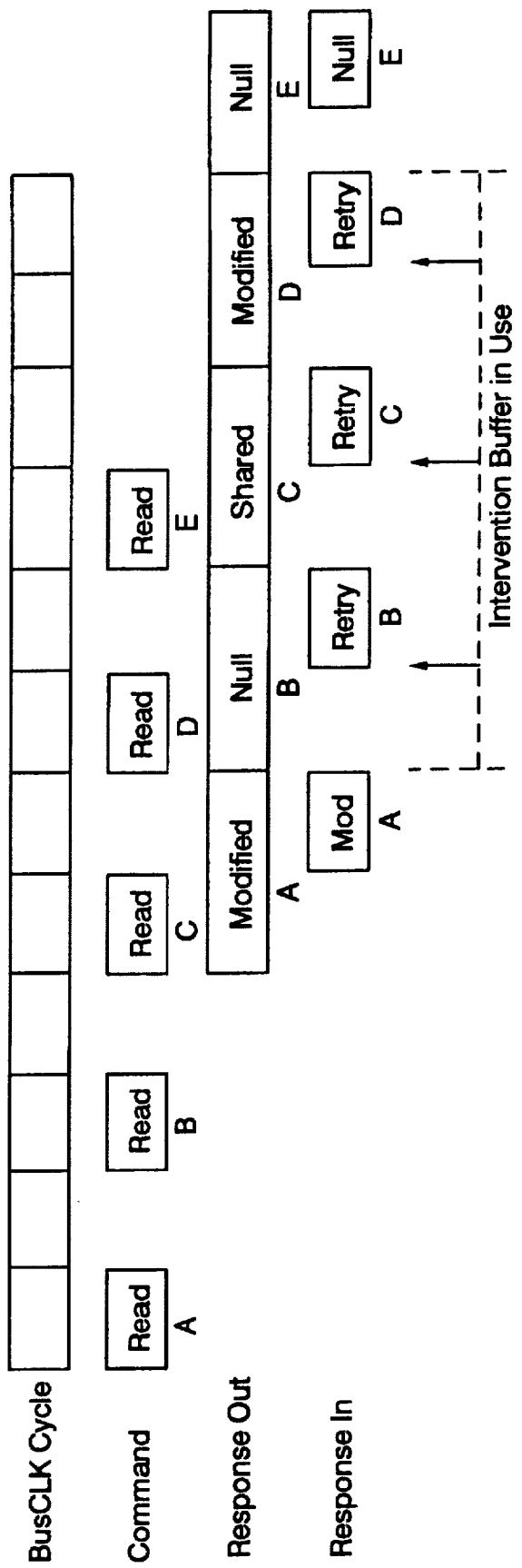
FIG. 4 is a timing chart showing a prior art single intervention buffer but without the present invention.

Referring now to FIG. 4 the timing of a prior art single intervention buffer mechanism is described where the memory controller must retry future Reads when the single intervention buffer is in use. The Read command A receives a modified response causing the intervention buffer to be used. The memory controller must therefore retry all future reads until that buffer is freed up. Reads B, C and D in FIG. 4.

Figure 5:
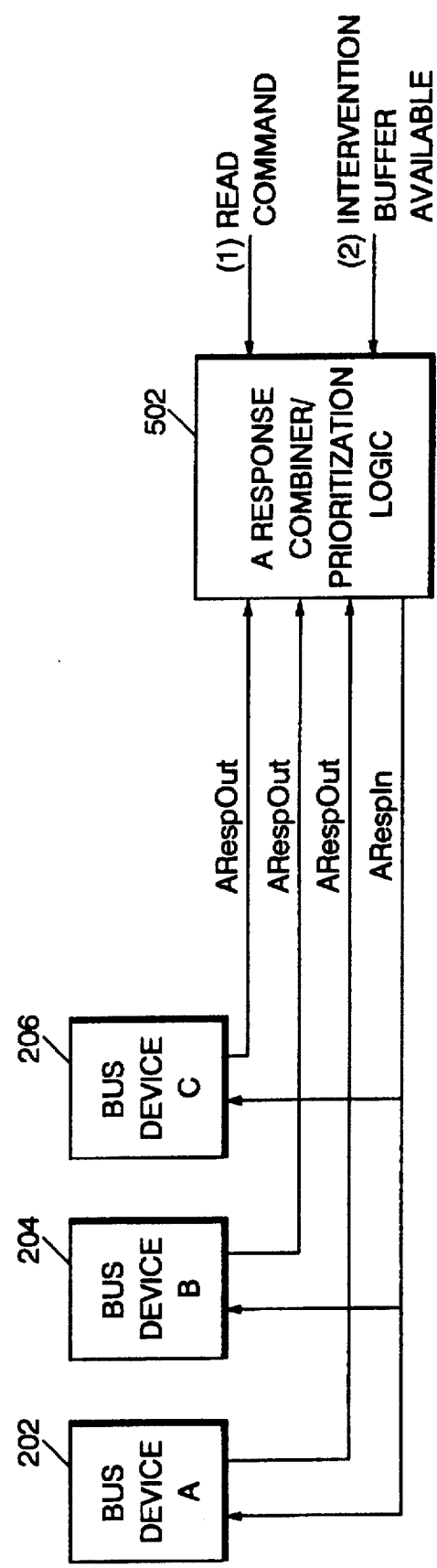
FIG. 5 is a block diagram showing the response combining/prioritization logic in accordance with the present invention.

Referring now to FIG. 5, combining logic in accordance with a preferred embodiment of the present invention will be described.

Memory controller 110 includes combining logic 502. In addition to the inputs and outputs and internal logic of the prior art combining logic 200 described above and in the referenced patent application, combining/prioritization logic 502 includes logic to detect a read command input indicating that a response window currently being combined is from a read command and a buffer available input indicating that the memory has an intervention buffer available so that intervention may be performed. As before, response out signals are received from bus devices 202, 204, and 206, and a response in signal is broadcast to all bus devices 202, 204, and 206. Combiner/prioritization logic 502 changes a modified (priority 2) input response to a retry (priority 1) output response for a read command when memory 112 (see FIG. 1) cannot allow intervention. When memory 112 can allow intervention, the modified response is returned without change.

Figure 6:
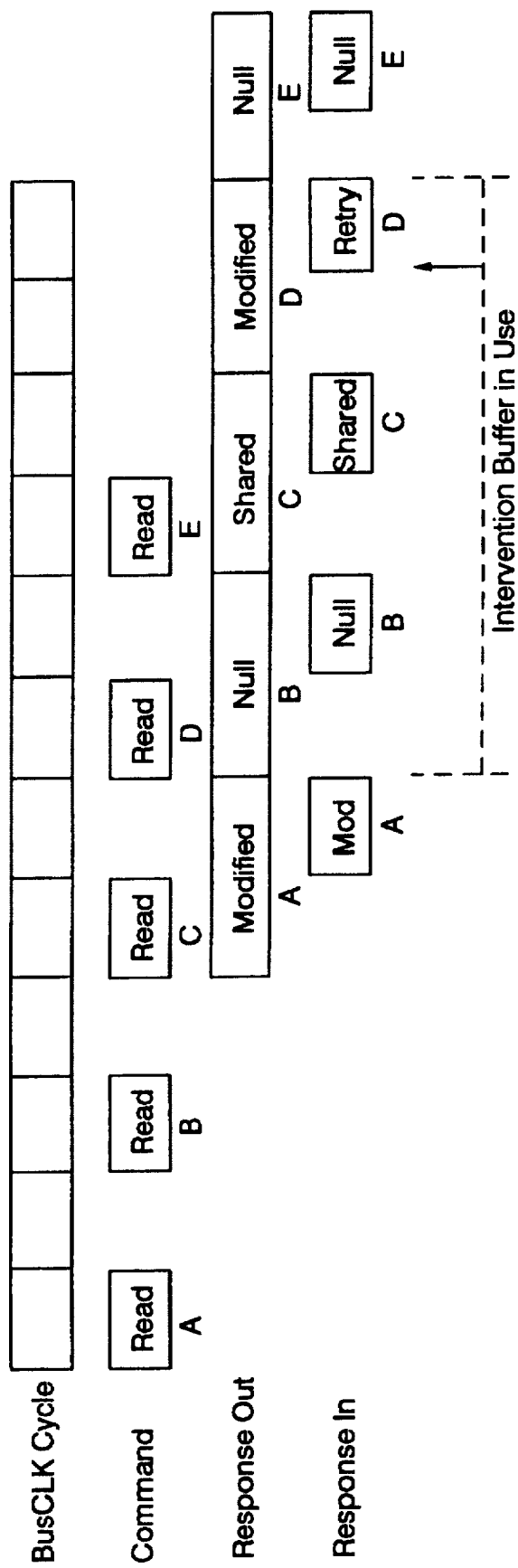
FIG. 6 is a timing chart showing the operation of the combining/prioritization logic in accordance with the present invention.

Referring now to FIG. 6, a timing diagram showing the operation of the preferred embodiment of the present invention using a single intervention buffer an demonstrating that future reads (read B, C, D, E) can be allowed to proceed even though the intervention buffer is in use unless a particular read command receives a Modified response. For example, read command A receives a modified response causing the intervention buffer to be used. Combining logic 502 only retries read D which has received a Modified response but not reads B and C which have a null response and a shared response, respectively. The present invention has been described with reference to a preferred embodiment in which response combining logic in a memory controller allows the memory controller to fully support intervention with only a single intervention buffer while minimizing the number of retries for future reads when the intervention buffer is in use, thereby increasing system performance with very little increase in logic.

Accordingly, the scope of this invention is limited only by the following claims and their equivalents.

What is claimed is:

1. An information handling system, comprising:

one or more processors;

a processor bus, connected to each of the processors;

a system memory;

a memory controller, connected to the processor bus, for controlling access to the system memory;

one or more I/O controllers, connected to the system bus;

a system controller, for controlling access to the system bus by all of the elements connected to the system bus; and means for modifying a coherency response set to allow an intervention of a read command so that the intervention is not allowed by the system memory.

2. An information handling system, according to claim 1, further comprising:

a single intervention buffer for storing data modified due to an intervention.

3. An information handling system, according to claim 1, further comprising:

means responsive to a read command for signaling that a current response window is for a read command.

4. An information handling system, according to claim 1, further comprising:

means responsive to an intervention buffer available signal for enabling intervention.

* * * * *